United States Patent [19]

Othold et al.

[11] Patent Number: 4,570,976
[45] Date of Patent: Feb. 18, 1986

[54] SLEEVE-SHAPED COUPLING FOR PIPELINES

[75] Inventors: Rolf Othold, Oldenburg; Heinz Hetzenecker, Bad Zwischenahn, both of Fed. Rep. of Germany

[73] Assignee: Oltmans, Ziegel und Kunststoffe GmbH, Edewecht/Jeddeloh 1, Fed. Rep. of Germany

[21] Appl. No.: 534,968

[22] Filed: Sep. 22, 1983

[30] Foreign Application Priority Data

Sep. 25, 1983 [DE] Fed. Rep. of Germany ....... 3235624

[51] Int. Cl.⁴ .............................................. F16L 37/00
[52] U.S. Cl. ...................................... 285/4; 285/197; 285/373; 285/419; 285/DIG. 4
[58] Field of Search ................... 285/4, 197, 319, 373, 285/DIG. 22, DIG. 4, 419

[56] References Cited

U.S. PATENT DOCUMENTS

| 1,215,595 | 2/1917 | Weikert et al. | 285/DIG. 22 |
| 1,570,887 | 1/1926 | Graves | 285/373 |
| 1,661,674 | 3/1928 | Osborn | 285/319 |
| 3,362,730 | 1/1968 | Clair et al. | 285/197 |
| 3,386,606 | 6/1968 | Pastrick | 174/50 |
| 3,695,643 | 10/1972 | Schmunk | 285/DIG. 4 |
| 4,019,760 | 4/1977 | Streit | 285/137 R |

FOREIGN PATENT DOCUMENTS

| 0020213 | 12/1980 | European Pat. Off. | 285/DIG. 22 |
| 2442937 | 3/1976 | Fed. Rep. of Germany | 285/197 |
| 2508424 | 9/1976 | Fed. Rep. of Germany | 285/373 |
| 7507218 | 12/1976 | Netherlands | 285/DIG. 4 |

Primary Examiner—Cornelius J. Husar
Assistant Examiner—Eric K. Nicholson
Attorney, Agent, or Firm—Emrich & Dithmar

[57] ABSTRACT

A sleeve-shaped pipeline coupling device for pipelines which is divided at least once in a direction transverse to the circumferential direction and adapted to be placed into close sealing contact against the outer wall of the pipeline. The coupling device includes at least one radial shoulder having an outer wall with an opening and a pipe fitting member portion being provided with a radial opening. The pipe fitting member portion includes a radial flange at one end having at least one arresting member formed integrally with the side thereof facing away from the pipe fitting. When the pipe fitting member portion is engaged to the coupling device, the arresting member engages the edge of the opening formed in the shoulder and the flange is in sealing contact against the shoulder.

10 Claims, 6 Drawing Figures

SLEEVE-SHAPED COUPLING FOR PIPELINES

BACKGROUND OF THE INVENTION

The present invention relates to a sleeve-shaped pipeline coupling device for corrugated pipelines, with the pipeline coupling device being divided substantially in half at least once transverse to the circumferential direction and being adapted to be placed into close tensile stress contact against the outer wall surface of the corrugated pipeline. Preferably, the pipeline coupling includes at leaset one radial shoulder thereon which is provided with a radial opening adapted to receive a separate pipe fitting member to provide a connection of the pipeline ends or junction for branch pipes.

A coupling structure has been known in the past which consists of two coupling members with a threaded branch pipe formed integrally with one of the coupling members (German disclosure letter No. 29 31 285). Also, it has also been suggested and known to form the branch pipe separately and in a manner wherein it is capable of replacement or it is interchangeable with different inner threads in the coupling member for the accommodation of different connecting pipes of different diameters (German disclosure letter No. 24 42 937). In such an instance, the fitting is inserted from inside with a radial flange abutting against the underside of the margin or edge of the opening of the member. However, such pipe couplings are relatively costly, time consuming in installation and complex in operation.

Additionally, it has been suggested to utilize a pipe connection having an elastic sealing sleeve. In such a disclosure, the sealing sleeve is brought into engagement with the circumferential edge of an opening provided in the pipeline. The pipeline has a corrugation formed at the inner wall which is in engagement with the corrugation of the branch pipe (German patent letter No. 2 200 626). However, because the manufacture of such a pipe connection is expensive and because of the lack of adaptability to various sized pipelines, such structures have found limited application.

SUMMARY OF THE INVENTION

It is an object of the present invention to provide a sleeve-shaped pipeline coupling device for corrugated pipelines which is of a simple construction and which may be manufactured and fitted in a simple manner while being suited both for the connection of adjacent pipeline ends together and for the formation of junction for pipe branching connection or junction.

In accordance with the present invention, the principle object is attained by the use of a novel corrugated sleeve-shaped pipeline coupling device which is divided substantially in half into two-part coupling members at least once transverse in the circumferential direction and which is adapted to be positioned about the outer wall surface of the corrugated pipeline to provide contact and seal thereabout for the connection of adjacent pipeline ends together. The pipeline coupling device includes at least one radial shoulder member formed integrally thereon in substantially a perpendicular direction away from the plane of division of the two-part coupling members. The radial shoulder member includes a prescored cover member thereon which may be predeterminedly removed to define a radial opening therein, which opening is adapted to receive a separate pipe fitting member portion to provide a junction or connection for branch piping, as will hereinafter be described.

The pipe fitting member portion is provided with a radial flange at one end thereof, with the flange having at least one arresting member formed integrally at the side thereof facing away from the pipe fitting. The arresting member snappingly engages the edge of the opening provided by the radial shoulder on the coupling device with the radial flange in close contact against the outer surface of the shoulder member. With the coupling device according to the present invention, the pipe fitting member portion is adapted to accommodate or receive a branching pipe which is plugged, turned or pushed into the pipe fitting member to be retained and sealingly connected to the pipe fitting member. The ready and speedy attachment of the branching pipe to the pipe fitting member portion, as well as the attachment of the pipe fitting member portion to the sleeve-shaped pipeline coupling device is simple to perform and results in a coupling device which provides substantial savings with respect to both time and material than provided by the coupling structures in accordance with the prior art.

The arresting member or members on the flange of the pipe fitting member portion may be formed by a circumferentially extending ring, such as, for example, which is provided by an undercut which may optionally be relieved at circumferentially spaced intervals to provide the ring with an improved flexibility. The arresting member or members may also be formed of individual annular segments arranged in mutually spaced relationship and provision is made in one embodiment of the present invention for several circumferentially spaced nose-like projections to be formed integrally on the flange, with each of the projections having radially outwardly extending arresting shoulders which engage the edge of the opening in the radial shoulder member. In such an arrangement, the inner peripheral edge of the opening in the radial shoulder member lies against the arresting nose-like projections while the arresting shoulders are engaged beneath the edge of the shoulder opening. In such a manner, the pipe fitting member portion is secured both axially and laterally from displacement from the coupling device.

The novel sleeve-shaped pipeline coupling device in accordance with the present invention furthermore possesses the substantial advantage in that it may be utilized both for the formation of pipeline branching and as a means of mechanically connecting together adjacent pipeline ends. Thus, it is provided that the shoulder member preferably includes a prescored cover member which may be removed to be engaged by the pipe fitting member portion or which may be left in tact when the coupling member is utilized solely for mechanically and sealingly connecting together adjacent pipelines ends. Additionally, the coupling device and the pipe fitting member portion are preferably formed of synthetic material and the prescored cover member on the shoulder member may be of a thinner layer of material in such a manner that the layer may be detached and taken out through a simple mechanical operation in order to insert the pipe fitting member portion to the coupling device. Also, if the prescored covering member is not removed from the radial shoulder member, the coupling device is impermeable over its entire periphery thereof and thus prevents the exit of the medium carried in the pipelines and provides that the adjacent pipeline ends are mechanically and sealingly connected together.

Provision is made also in a further embodiment of the present invention in that the sleeve-shaped pipeline coupling device is comprised of a two-part coupling member or element, the division of which extends through the longitudinal center plane of the sleeve-shaped coupling member. At least one of the coupling elements may have an outward facing shoulder member thereon which may be provided with a covering member which may be prescored and which defines a circular opening therein which is adapted to receive a separate pipe fitting member portion to provide a connection or junction, as hereinafter described.

Although there are several possibilities for accomplishing the connection of the branching pipe to the pipe fitting member portion, provision is made in the present invention for at least one tongue element to be integrally shaped to the wall of the pipe fitting member portion such that the tongue member projects inwardly into the pipe fitting member in the direction of the pipe fitting flange. When the branching pipe is pushed, turned or pressed into the pipe fitting member, the tongue will be deformed radially outwardly so that it will resist the pushing, turning or pressing operation. Accordingly, the branching pipe will be fixedly engaged and attached to the pipe fitting member portion and the free end of the tongue element will engage against the branching pipe wall and prevent the removal of the branching pipe from the pipe fitting member portion.

As noted above, the present invention has particular applicability and advantages in the use of corrugated pipelines, in which case the sleeve-shaped coupling member will have a corrugation complimentary to the corrugation on the pipeline. In one application, for example, the present invention is particularly useful in conjunction with drainage pipe and in particular to the connecting of drainage pipes having a small diameter (suction pipes) to the drainage pipes of a larger diameter (collecting pipe). In the use of corrugated pipelines and corrugated branch piping, the tongue element on the pipe fitting member portion is particularly effective in preventing the removal of the branching pipe from the pipe fitting member portion.

When the sleeve-shaped pipeline coupling device is utilized in corrugated pipelines for pressureless transport of water, it is preferably desired to utilize a sealing ring positioned in the groove formed by the adjacent corrugated pipeline ends bordering each other. Accordingly, when the two-part coupling members are positioned about the aligned ends of the corrugated pipes and the sealing ring is positioned in the defined groove thereof, the fixed connection of adjacent pipeline ends together is readily accomplished. The sealing ring may be a lip ring, an O-ring, or a sealing ring provided with wedge-like formations thereon.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DETAILED DESCRIPTION

Figure 1:
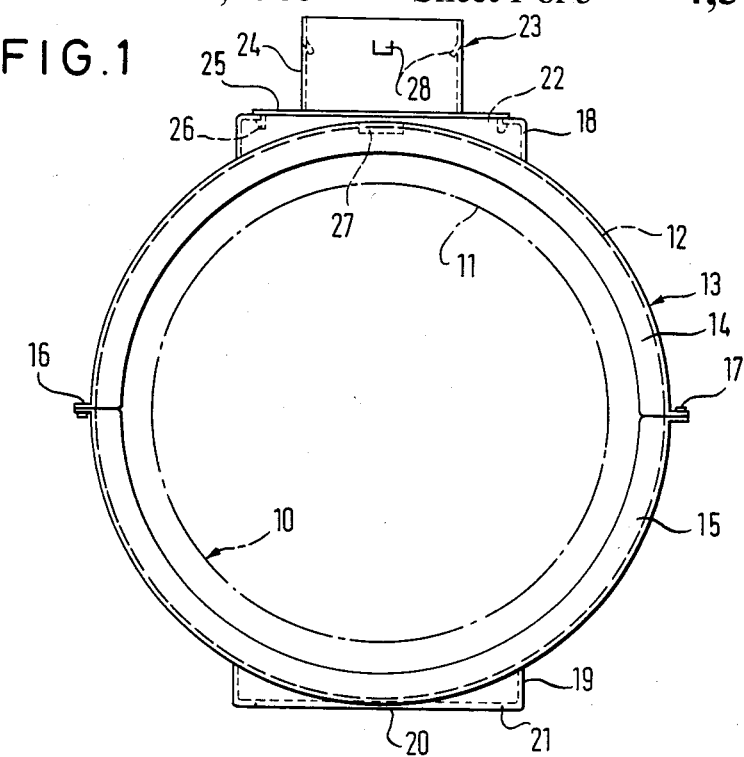
FIG. 1 is a cross-sectional view of a pipeline provided with the coupling device in accordance with the present invention.
Figure 6:
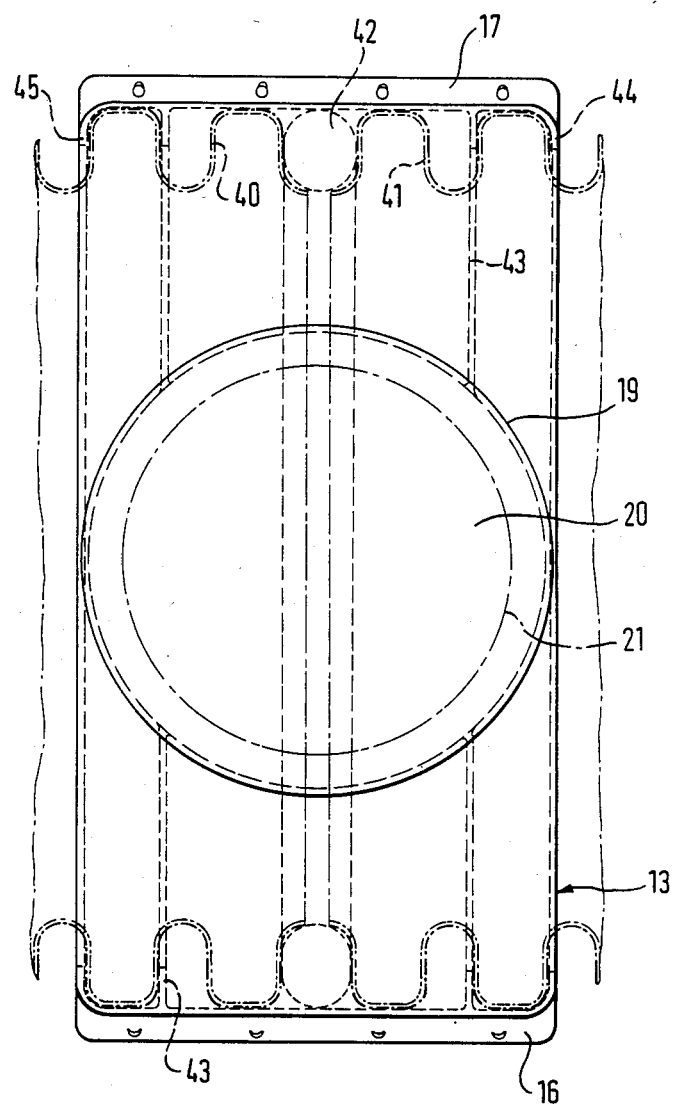
FIG. 6 is a top plan view of a pipeline connection provided with the coupling device in accordance with the present invention.

Referring now to the drawings wherein like numerals have been used throughout to indicate the same or similar parts, FIGS. 1 and 6 describe one embodiment of the pipeline coupling device 13 mounted to adjacent ends and a corrugated plastic pipe 10 in accordance with the present invention. As shown in FIG. 1, the lowest line of the wave troughs identified as numeral 11 and the highest line of the wave crests is shown in broken lines is identified as numeral 12. The corrugated plastic pipeline 10 is particularly useful in conjunction with and use as a collector for purposes of drainage. The sleeve-like pipeline coupling device 13 includes a corrugation complimentary to the corrugations on the pipeline 10 and is of a width covering at least two but preferably more than four corrugations of the pipeline 10, as shown in FIG. 6.

The pipeline coupling device 13 is divided substantially in half and is comprised of two coupling members 14 and 15, the plane of division of which extends through the longitudinal center plane of the device 13. Both coupling members 14 and 15 have outward facing flanges 16 and 17, respectively, which may be connected to each other by a screwing arrangement as shown in FIGS. 1 and 6. The coupling members 14 and 15 each possess a radial shoulder 18 and 19, respectively, radially offset outwardly therefrom substantially in a direction perpendicular from the plane of division which may be of any suitable cross sectional configuration, but preferably, circularly shaped or in the shape of a square. The radial shoulders 18 and 19 are formed by a tubular extension formed integrally with the coupling members 14 and 15. The radial shoulder 19 is closed by a prescored cover member or wall 20 having a circularly circumferentially extending scored or prescored parting line 21 therein, as shown in FIGS. 1 and 6. The radial shoulder 18 is of a similar or the same design as the radial shoulder 19 during the production of the coupling device 13; however, the portion of the wall 20 disposed within or inside the prescored line 21 has been broken away or removed, respectively. In this manner an opening 22 is formed, which is adapted to or serves to accommodate the pipe fitting member portion 23 of the coupling device 13.

The pipe fitting member portion 23 includes a branch pipe connection member 24 and a flange 25, with the flange being formed integrally at one end of the pipe connection member 24. On the outside facing away from the pipe connection member 24, the flange 25 is provided with several arresting nose-like formations or projection members 26 which snappingly engage beneath the edge of the opening 22, as shown in FIG. 1. As indicated in FIG. 1, an opening 27 (shown in dotted lines) is formed in the pipe 10 which thus is in communication with the pipe connection member 24.

As shown in FIGS. 1-4, the pipe connection member 24 includes at least one tongue element 28 therein projecting into the interior of the pipe connection member 24 with the free end 34 thereof pointing into the direction of the end of the pipe connection member portion 23 provided with the flange 25.

Figure 4:
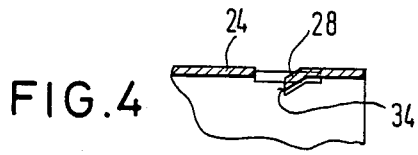
FIG. 4 is an enlarged sectional view of the tongue elements utilized in attaching the branching pipe to the pipe fitting member portion in accordance with the present invention.
Figure 3:
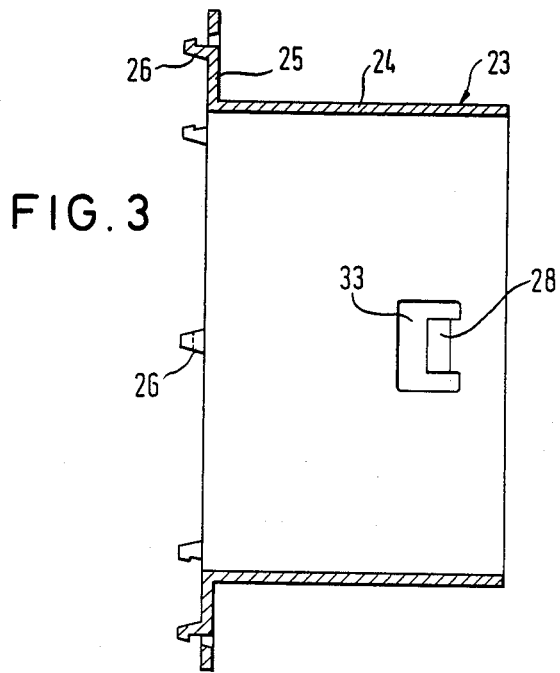
FIG. 3 is a longitudinal sectional view of the pipe fitting member portion of the coupling device in accordance with the present invention.
Figure 5:
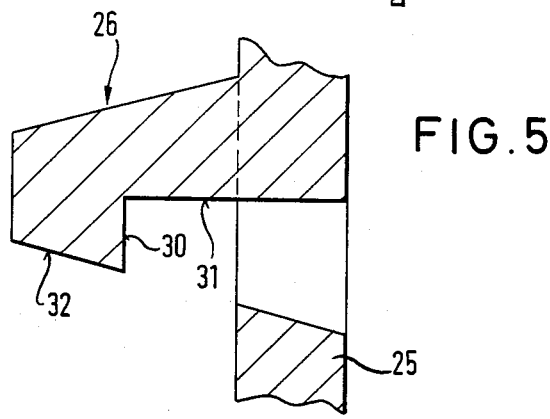
FIG. 5 is an enlarged cross-sectional view of the attachment members on the flange of the pipe fitting member portion of the coupling device in accordance with the present invention.

FIGS. 2-5 show an enlarged representation of the pipe connection member portion 23. From FIG. 2, it may be recognized that eight arresting nose-like formations or projections 26 are provided on the outer surface of the annular flange 25 at equally spaced circumferential intervals. Besides, the flange 25 is provided with four recesses 29 in equally spaced arrangement said recesses opening radially outwardly. The shape of the arresting nose-like formations or projections 26 may be seen more clearly in FIG. 5. The projections 26 include an arresting shoulder 30 which comes to lie at the rear of the edge of the opening 22 in the cover member or wall 20. The axially extending side 31 of the arresting nose-like formation or projection 26 in this arrangement comes to lie against the inner edge or periphery of the opening 22 when the member portion 23 is inserted into opening 22. The side 32 of the arresting nose-like projection 26 radially pointing outwardly outside the shoulder 30 is tapered, as shown in FIG. 5, as shown at 32, in order to facilitate the introduction into the opening 22 and the temporary deformation of the arresting nose-like projections 26.

Figure 2:
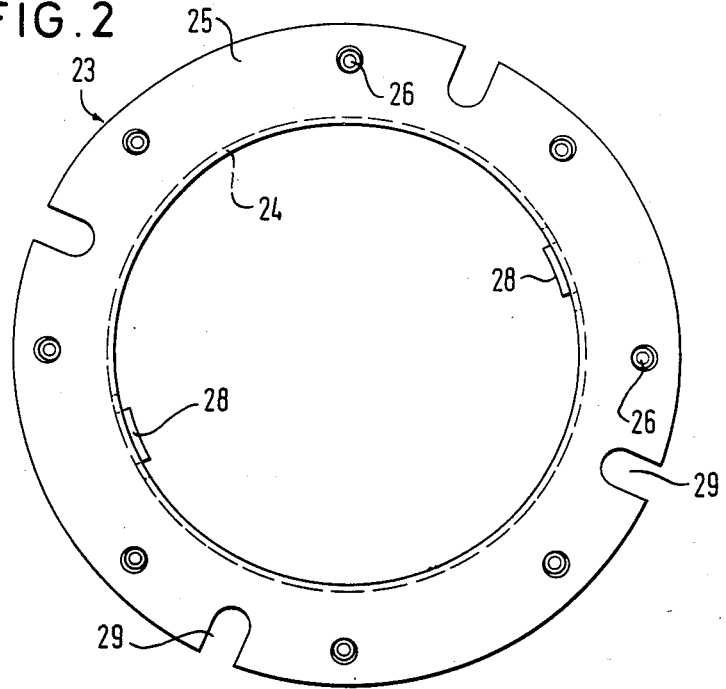
FIG. 2 is an end view of the pipe fitting member portion of the coupling device in accordance with the present invention.

In FIG. 2 it is shown that two diametrically opposed tongue elements 28 are provided in pipe connection element 28 which are formed by a U-shaped or C-shaped relieving cut 33 so that while being tied only at one side of the member 34, they are freely movable radially but against the force of a spring. They are provided, as shown in FIG. 4, with a relatively sharp edge or free end 34 which forcefully resists a pulling-out movement of a branching pipe which introduced into the pipe connection member 24.

From the drawing FIG. 6, it will be noted how the coupling device 13 shown in the preceding figures may be used solely for the connection of two corrugated pipelines 10. The corrugated pipes 40 and 41 are cut off at the ends thereof in such a manner that when the ends are brought together, a trough will form for the accommodation of a sealing ring 42. The sealing ring 42 is dimensioned in such a manner that a minimal gap remains between the corrugated pipes bordering each other.

Accordingly, from FIG. 6, the adaptation of the coupling device 13 to the corrugation of the pipelines 40 and 41 may be recognized by way of the broken line representation. For this purpose, individual ribs 43 are provided engaging within the wave troughs. At the ends, a radial flange 44 and 45, respectively, is provided which has an arcuate portion of transition for the purpose of adaptation to the corresponding wave crest encompassed by the flange 44, 45. Thus, the coupling device 13 when positioned about the ends of pipelines 40 and 41, will fixedly and sealingly connect to two adjacent ends together.

We claim:

1. A sleeve-shaped coupling device for attachment of a branch pipe to a pipeline having a cylindrical outer wall, said coupling device being comprised of two coupling members sub-divided through the longitudinal center plane of said coupling device, with said two coupling members positioned circumferentially about and clamped in sealing contact against the cylindrical outer wall of the pipeline, with said coupling device having at least one radial extension shoulder thereon with said at least one radial extension shoulder including an end cover wall having a prescored break-off portion therein for providing an opening therein, with said coupling device further including a pipe fitting member portion comprised of a radial flange member and a pipe connection member for attachment of a branch pipe thereto, with said radial flange member formed integral to one end of said connection member and having at least one arresting member extending substantially perpendicular therefrom and axially positioned on said flange, such that upon engagement of said pipe fitting member portion to said radial extension shoulder of said coupling device, said at least one arresting member is engageable with said end cover wall surrounding said opening therein and said flange member is in contact against said end cover wall of said radial shoulder in sealing engagement thereto and the branch pipe is attached to said pipe connection member to complete the attachment of the branch pipe to the pipeline.

2. The coupling device in accordance with claim 1, wherein said at least one arresting member is formed integrally to said flange member and includes an arresting shoulder thereon which engage and hold said end cover wall surrounding said opening.

3. The coupling device in accordance with claim 1 wherein said coupling device includes two radial extension shoulders and said two radial extension shoulders are positioned on said coupling device in diametrically opposed position therearound.

4. The coupling device in accordance with claim 1 wherein said pipe fitting member portion includes at least one tongue element formed integrally with the pipe connection member and which projects obliquely into the interior of said pipe connection member in the direction of said flange member.

5. The coupling device in accordance with claim 1 wherein the pipeline is corrugated and said coupling members include corrugations complementary to the corrugated pipeline.

6. A sleeve-shaped coupling device for connecting adjacent ends of corrugated pipelines together having cylindrical outer walls, said coupling device being comprised of two coupling members sub-divided through the longitudinal center plane of said coupling device, with said coupling members positioned circumferentially about and clamped in sealing contact against the outer wall ends of the pipelines, with said coupling device further including an annular sealing ring, with each of said coupling members having corrugations complementary to the corrugated pipelines such that when said corrugated pipeline ends are cut-off the adjacent ends of the corrugated pipelines define an annular groove therein which receives said sealing ring, and wherein said coupling device is of such width as to engage and be clamped against at least two wave crests on each of the corrugated pipeline ends to sealingly retain and connect the adjacent ends of the corrugated pipeline together and wherein said coupling device further includes at least one radial extension shoulder thereon with said at least one radial extension shoulder including an end cover wall having a prescored break-off portion therein for providing an opening therein.

7. The coupling device in accordance with claim 6 wherein said coupling device further includes a pipe fitting member portion comprised of a pipe connection member and a radial flange member mounted to one end of the pipe connection member, with said radial flange member having at least one arresting member extending substantially perpendicularly therefrom and axially positioned on said flange, whereby when said scored break-off portion is removed from said end cover wall said opening is provided in said end cover wall, such that upon the engagement of said pipe fitting member portion to said end cover wall, said at least one arresting member is engageable with said end cover wall surrounding said opening therein and said flange member is in contact against said end cover wall of said radial shoulder in sealing engagement thereto to permit a branch pipe to be attached to said pipe connection member and to the pipeline.

8. The coupling device in accordance with claim 7 wherein said at least one arresting member is formed integrally to said flange member and includes an arresting shoulder thereon which engage and hold said end cover wall surrounding said opening.

9. The coupling device in accordance with claim 7 wherein said coupling device includes two radial extension shoulders and said two radial extension shoulders are positioned on said coupling device in diametrically opposed position therearound.

10. The coupling device in accordance with claim 7 wherein said fitting member includes at least one tongue element formed integrally with the pipe connection member and which projects obliquely into the interior of said pipe connection member in the direction of said flange member to engage and hold said branch pipeline which is inserted into said pipe connection member.

* * * * *